United States Patent [19]
Langford et al.

[11] 3,949,232
[45] Apr. 6, 1976

[54] HIGH-VOLTAGE ARC DETECTOR

[75] Inventors: Obie M. Langford; Harold E. Peelman, both of Houston, Tex.

[73] Assignee: Texaco Inc., New York, N.Y.

[22] Filed: Sept. 30, 1974

[21] Appl. No.: 510,661

[52] U.S. Cl. ................ 250/501; 250/405; 250/499
[51] Int. Cl.² .......................................... G21G 4/02
[58] Field of Search .......... 250/499, 500, 501, 502, 250/419, 409, 414, 405

[56] References Cited
UNITED STATES PATENTS

| | | | |
|---|---|---|---|
| 2,607,011 | 8/1952 | Kalman | 250/409 |
| 3,315,124 | 4/1967 | Boeker | 250/409 |
| 3,405,275 | 10/1968 | Bergan | 250/501 |
| 3,657,536 | 4/1972 | Langford | 260/501 |

Primary Examiner—Harold A. Dixon
Attorney, Agent, or Firm—T. H. Whaley; C. G. Ries; Henry C. Dearborn

[57] ABSTRACT

A well-logging sonde employs a neutron generator. It has a high-voltage supply for the target of the neutron generator tube. The sonde includes an insulated high-voltage conductor for connecting the supply to target, and there is a metallic ring supported on the insulation surrounding the conductor. The ring and conductor form a capacitor that is connected to a circuit for controlling the deenergization of the high-voltage supply if an arc occurs.

6 Claims, 3 Drawing Figures

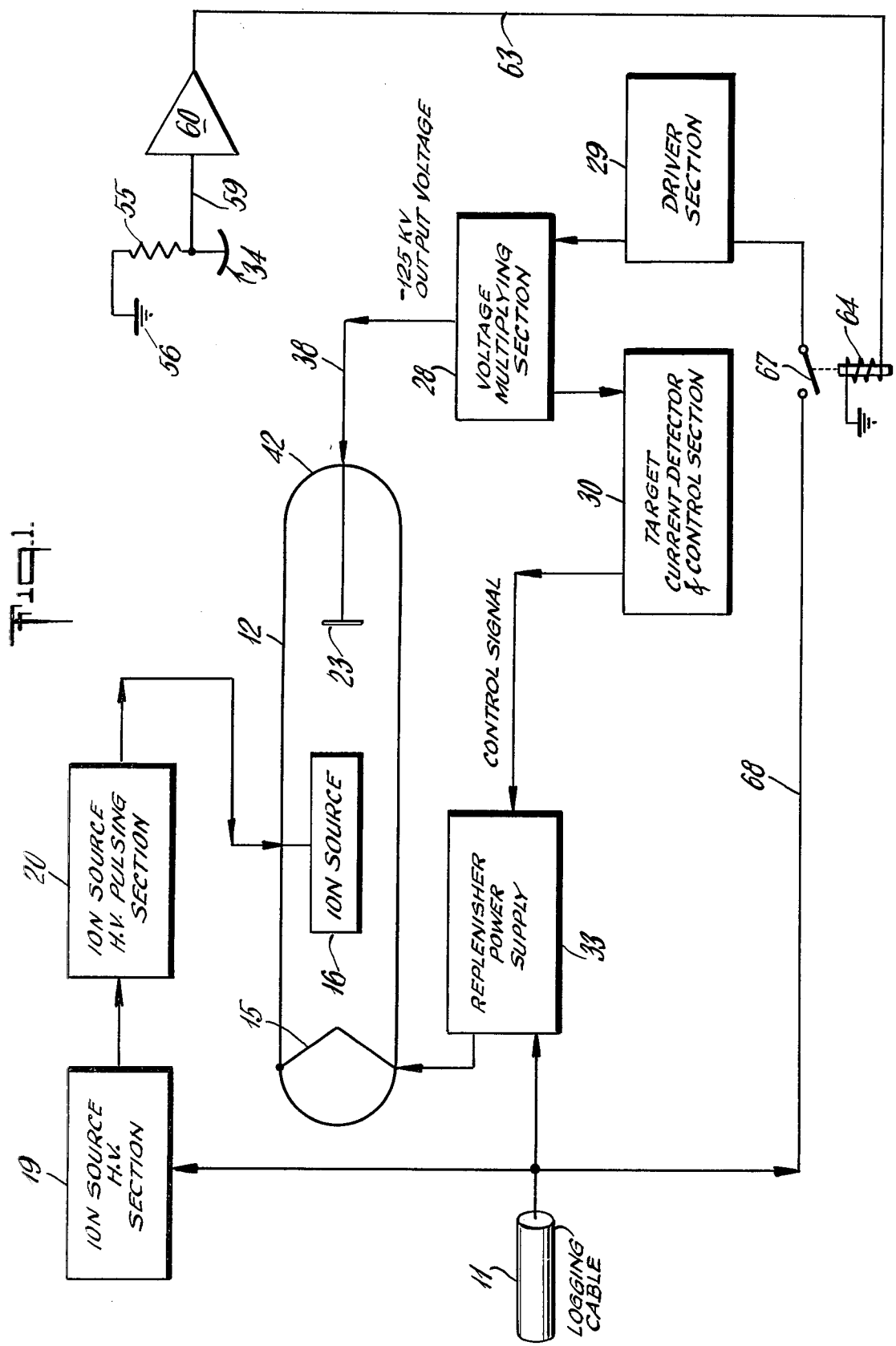

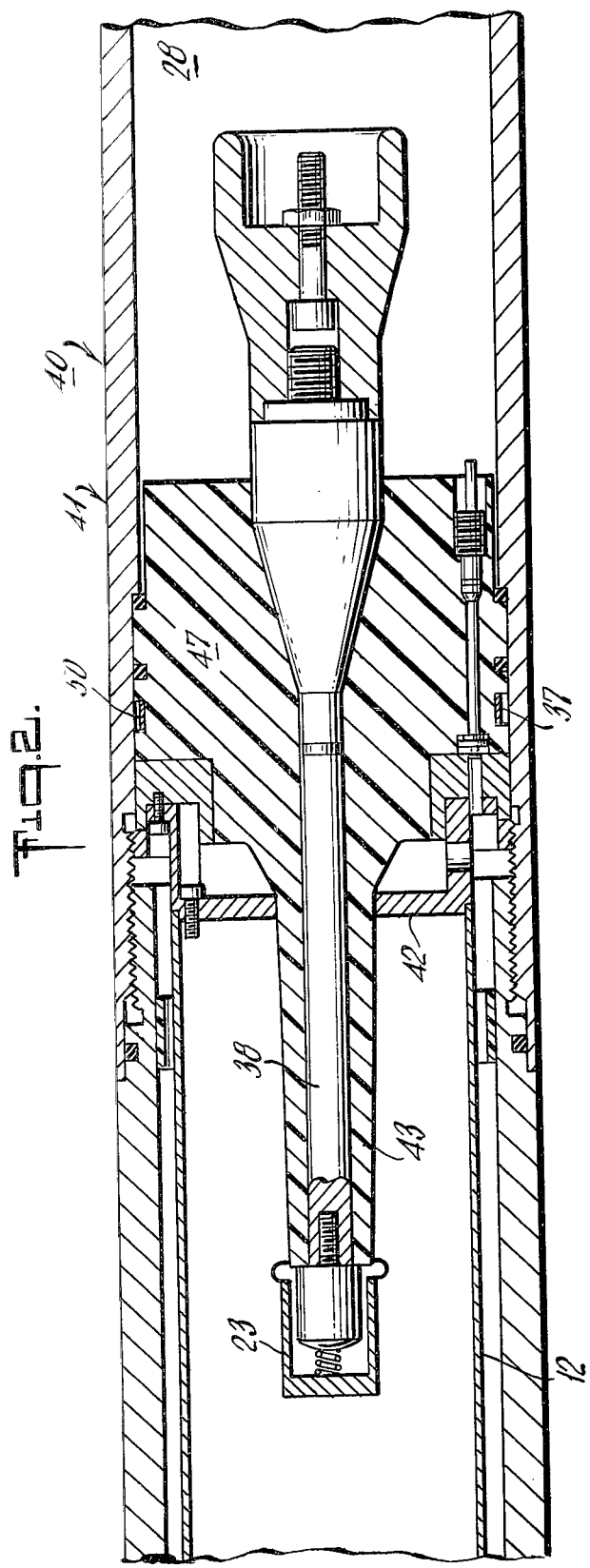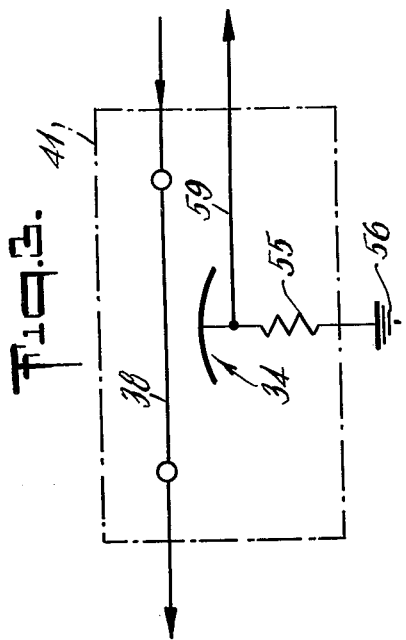

HIGH-VOLTAGE ARC DETECTOR

BACKGROUND OF THE INVENTION

1. Field of the Invention

This invention concerns nuclear oil well-logging in general. More specifically, it relates to an improvement applicable to a high-voltage neutron generator as used in a logging tool. It particularly deals with a detector for sensing and controlling arcing conditions.

2. Description of the Prior Art

It has been found in connection with well-logging instruments of the type which use a neutron generator, that the exceedingly high voltage employed tends to create conditions such as to subject the generator to a high-voltage discharge, or breakdown. Furthermore, such conditions are unstable, and the arcs involved are frequent and large in amplitude. Consequently, if such arcs continue without control, the glass envelope of the neutron tube can be punctured. Clearly, such results are troublesome and expensive and may involve considerable loss of valuable equipment.

Consequently, it is an object of this invention to provide a means for detecting arcing conditions so that protective steps may be taken to avoid destructive conditions.

SUMMARY OF THE INVENTION

Briefly, this invention concerns a high-voltage arc detector for protecting against breakdown of well-logging equipment where such equipment has a high-voltage supply and a neutron generator tube connected to said high-voltage supply. The invention comprises in combination a high-voltage connector for carrying said high voltage from said supply to said tube, and insulation surrounding said connector. It also comprises capacitance means associated with said connector for producing a signal when an arc occurs.

Again, briefly, the invention concerns a high-voltage arc detector for protecting against breakdown of well-logging equipment, which has a high-voltage supply and a neutron generator tube connected to said voltage supply. It comprises in combination a cylindrical housing for said equipment enclosing said high-voltage supply and said neutron generator tube. It also comprises a section of said housing which encloses an axially located high-voltage connector comprising a metallic cylindrical conductor for carrying said high voltage from said supply to a target in said tube. It also comprises high-voltage insulation filling said housing section surrounding said cylindrical conductor, and a thin relatively narrow electrically conductive strip located in a circumferential groove in said insulation and located longitudinally between said high-voltage supply and said neutron generator tube, and radially spaced from said conductor in order to form an electrical capacitor therewith. It also comrpises a resistor connected between said strip and circuit ground, and an amplifier having an input and an output as well as a relay having a switch for controlling energization of said high-voltage supply. It also comprises first circuit means for connecting said strip to said amplifier input, and second circuit means for connecting said amplifier output to said relay in order to activate said relay whenever an arc occurs so that the high-voltage supply will be deenergized.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 1 is a schematic diagram illustrating a logging-tool system employing the invention;

FIG. 2 is a longitudinal cross-section illustrating the structure of the connector portion of a logging tool that incorporates a detector according to the invention; and FIG. 3 is a schematic circuit diagram illustrating the electrical connections employed with a detector according to the invention.

DESCRIPTION OF THE PREFERRED EMBODIMENT

Referring to FIG. 1, it will be observed that this block-diagram showing illustrates a typical circuit as it is employed with a logging tool of the type to which this invention applies.

There is a logging cable 11 that carries the electrical circuit connection from the logging tool, or sonde, to the surface when the tool is in a borehole. The system shown includes elements located in the logging sonde. There is a neutron generator tube 12 that has an evacuated interior. This might be one of several commercially available neutron generator tubes, e.g., one designated by the trade name Amperex Model 18603, which is manufactured by Philips Research Laboratories, Eindhoven, Netherlands. This generator develops the required neutrons, and it consists of a gas-replenisher element 15 that keeps a constant gas pressure within the tube 12. Also, there is a Penning ion source which is indicated by box 16 captioned "ION SOURCE". Associated with the ion source, there is a high-voltage section, and a high-voltage pulsing section. These are indicated as being connected to the ion source 16 located between replenisher element 15 and the target 23. This arrangement is indicated by boxes 19 and 20 with the captions "ION SOURCE H.V. SECTION" and "ION SOURCE H.V. PULSING SECTION", respectively, thereon. The target 23 has a steady DC high-voltage negative potential applied for producing the desired neutrons caused by bombarding the target. Target 23 is constructed of titanium that retains tritium in a self-replenishing manner so that it does not limit the lifetime of the tube 12.

The high voltage applied to the target 23 is obtained by a Cockroft-Walton type of high-voltage supply. It includes a "VOLTAGE-MULTIPLYING SECTION" 28, and a "DRIVER SECTION" 29 as well as a "TARGET CURRENT DETECTOR & CONTROL SECTION" 30. As already indicated, this supply system develops a high-voltage DC potential of minus 125 KV. It will be observed that the control section 30 is also connected to the replenisher element 15 via a "REPLENISHER POWER SUPPLY" 33.

The manner of operating a logging sonde such as that illustrated in FIG. 1, need not be discussed since it is not directly relevant to the invention. It is sufficient to note that under certain conditions the neutron tube 12 will experience a high-voltage discharge or breakdown. During this unstable condition the resulting arcs are frequent and large in amplitude. Consequently, if such arcing is not controlled, the glass envelope of the neutron tube 12 can be punctured. But this can be avoided by the invention.

There is a capacitor 34, one plate of which is schematically indicated in FIGS. 1 and 3. It is physically constructed as illustrated in FIG. 2. There is a thin metallic strip 37 that is associated with a high-voltage connector 38. This connector 38 is a good electrical conductor, and it connects the output voltage of the multiplying section 28 with the target 23 of the tube 12. A connector of this type is like a similar one that is illustrated and described in U.S. Pat. No. 3,657,536 where related mechanical details are described more fully.

The physical construction of the capacitor 34 is illustrated in FIG. 2 which shows a cross-sectional view of a connector portion 41 of a logging sonde 40 (partially shown). Again, this is similar to the aforementioned U.S. Pat. No. 3,657,536, and it shows that portion of a sonde which joins the neutron tube 12 with the voltage-multiplying section 28 of the sonde.

It may be noted that the neutron tube 12 has an end wall 42 through which extends a portion 43 of an insulating material 47 that has the high-voltage connector 38 axially located therein. The connector 38 carries the high voltage from the multiplying section 28 to the target 23, and it is axially located within the portion 41 of the sonde 40 which has a cylindrical housing as indicated.

In order to detect any arcing conditions (such as those indicated above), the capacitor 34 is constructed with the metal strip 37 located in a groove 50 that circumferentially surrounds the connector 38 and is spaced radially therefrom. This arrangement forms the capacitor 34. The strip 37 acts as one plate, and the connector 38 acts as the other. The insulating material 47 acts as the dielectric for the capacitor 34.

The arcing conditions described above will create variations in the high-voltage potential, and this will be reflected by the capacitor 34. The capacitor 34 is connected in an electrical circuit which includes a resistor 55 that is connected between the strip 37 and a circuit ground 56.

In this way the voltage change that is reflected by the charge on the capacitor 34, is applied via a circuit connection 59 to an amplifier 60 (see FIG. 1). Then the amplifier-output signals are carried over a circuit connection 63 to the solenoid of a relay 64 which has a normally closed switch 67 that is actuated to the open position illustrated when the relay is energized.

Switch 67 is connected in series with a circuit connection 68 that supplies the driver section 29 of the sonde 40. Consequently, whenever an arc develops, it will cause the indicated change in the charge on capacitor 34, and this is amplified and applied to the relay 64 so as to deenergize the power supply (driver section 29) that controls the 125 KV target voltage. In this manner, the other parts of the system will automatically be turned off also so as to make the tube 12 inoperative. Consequently, any destructive breakdown of the tube envelope is avoided.

It will be appreciated that FIG. 3 indicates, in a schematic manner, the electrical circuit relationships of the elements of capacitor 34. One skilled in the art will understand that a capacitor for a system in accordance with the invention might take different forms from that illustrated in FIG. 2.

While an embodiment of the invention has been set forth above in considerable detail and in accordance with the applicable statutes, this is not to be taken as in any way limiting the invention but merely as being descriptive thereof.

We claim:

1. High-voltage arc detector for protecting against breakdown of well-logging equipment having a high-voltage supply and a neutron generator tube connected to said high-voltage supply, comprising in combination:
   a high-voltage connector for carrying said high voltage from said supply to said tube,
   insulation surrounding said connector,
   capacitance means associated with said connector for producing a signal when an arc occurs, and
   means controlled by said signal for deenergizing said high-voltage supply.

2. High-voltage arc detector according to claim 1, wherein
   said capacitance means comprises a metallic ring surrounding at least part of said insulation, and a resistor connected between said ring and ground.

3. High-voltage arc detector according to claim 2, further comprising means controlled by said signal for deenergizing said high-voltage supply.

4. High-voltage arc detector according to claim 3, wherein said means controlled by said signal comprises
   an amplifier,
   a relay, and
   circuit means for connecting said metallic ring to said amplifier and said amplifier to said relay.

5. High-voltage arc detector according to claim 4, wherein said means controlled by said signal further comprises
   a switch actuated by said relay for controlling energization of said high-voltage supply.

6. High-voltage arc detector for protecting against breakdown of well-logging equipment having a high-voltage supply and a neutron generator tube connected to said high-voltage supply, comprising in combination
   a cylindrical housing for said equipment enclosing said high-voltage supply and said neutron generator tube,
   a section of said housing enclosing an axially located high-voltage connector comprising a metallic cylindrical conductor for carrying said high voltage from said supply to a target in said tube,
   high-voltage insulation pilling said housing section surrounding said cylindrical conductor,
   a thin, relatively narrow electrically conductive strip located in a circumferential groove in said insulation longitudinally between said high-voltage supply and said neutron generator tube, and radially spaced from said conductor in order to form an electrical capacitor therewith,
   a resistor connected between said strip and circuit ground,
   an amplifier having an input and an output,
   a relay having a switch for controlling energization of said high-voltage supply,
   first circuit means for connecting said strip to said amplifier input, and
   second circuit means for connecting said amplifier output to said relay in order to activate said relay whenever an arc occurs, so that high-voltage supply will be deenergized.

* * * * *